United States Patent [11] 3,621,308

| [72] | Inventor | George J. Dusheck, Jr. |
| | | Cinnaminson, N.J. |
| [21] | Appl. No. | 788,861 |
| [22] | Filed | Jan. 3, 1969 |
| [45] | Patented | Nov. 16, 1971 |
| [73] | Assignee | The United States of America as represented by the Secretary of the Navy |

[54] LEVEL DETECTOR
5 Claims, 18 Drawing Figs.
[52] U.S. Cl.................................................... 307/318, 328/114, 328/118, 328/132
[51] Int. Cl.................................................... H03k 3/26
[50] Field of Search............................................. 340/347; 235/184; 330/69, 110; 328/142, 150, 114, 118, 132, 235, 236; 307/232, 235, 295, 236, 318

[56] References Cited
UNITED STATES PATENTS
3,052,852  9/1962  Logan ........................... 328/142
3,161,868  12/1964  Waldhaur..................... 340/347
3,398,373  8/1968  Caswell........................ 328/150

OTHER REFERENCES
Burr-Brown Research Corp. HandBook of Operational Amplifier Applications pgs. 45, 46 1st ed. 1963

*Primary Examiner*—Richard A. Farley
*Assistant Examiner*—Joseph G. Baxter
*Attorneys*—Edgar J. Brower and Henry Hansen ABSTRACT: A level detector is utilized as an interface between analog and digital circuitry. The level detector generates a digital "1" when the analog signal is above a predetermined level at other times a digital "0" is generated. This is accomplished by feeding the received analog signal through a variable resistor network to the noninverting input of an operational amplifier with a zener diode in the feedback network.

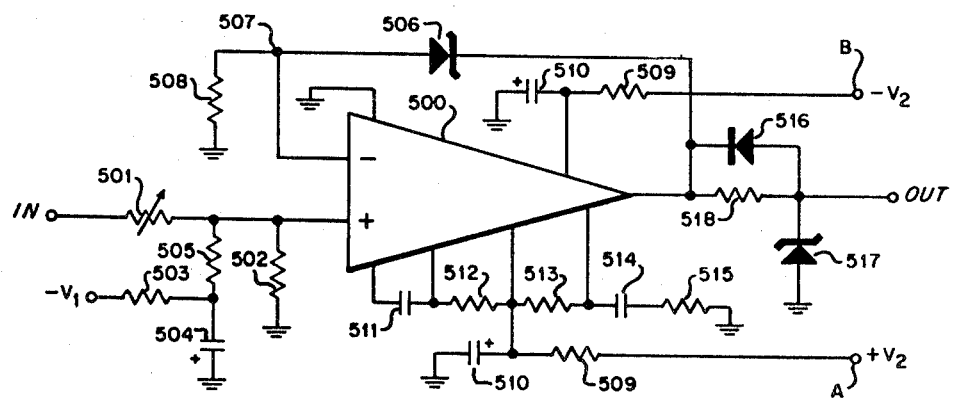

LEVEL DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a level detector for use in a feature recognition system which processes transient submarine signals occurring in the presence of signallike noise and which further recognizes certain relatively invariant features exhibited by the submarine signals and not by the noise signals.

In the field of submarine detection and recognition, magnetic anomaly detection (MAD) devices and techniques have long been utilized. Basically, MAD is an airborne system employing magnetometer elements which sense the presence of a submerged submarine by measuring the small distortion in the earth's magnetic field caused thereby. This technique is an exacting one as the earth's magnetic field intensity may be on the order of 10,000 times stronger than that of the submarine. Additionally, the high altitudes of the aircraft, or more exactly the long slant ranges to the submarine, cause the signals from the submarine to virtually disappear into the noise background. This noise is derived from a multiplicity of sources as from, for example, the magnetometer sensing element itself, the magnetic and electrical equipments of the aircraft, large magnetic fields external to the aircraft such as geologic mineral deposits beneath the ocean floor, and other phenomena.

Due to these many noise sources and the distance between sensor and submarine, the submarine signal is either completely disguised by the noise such that it cannot be recognized therefrom or the noise signals themselves produce a response similar to the submarine signals such that false recognitions are effectuated.

Prior art systems incorporated a trained human operator who memorized features or patterns known to be representative of the signature of a submarine and whose function it was to visually recognize and extract these submarine signals from data displayed before him. The accuracy of such a technique was relatively low and varied with the individual operator. In addition, all of the operators fatigued with time thus further decreasing accuracy. The result was that many false alarms were indicated and many actual targets were entirely missed.

Thus there arose a need for a system capable of automatically and electronically recognizing and detecting, with a high degree of accuracy and reliability, submarine signals occurring in the presence of signallike noise.

SUMMARY OF THE INVENTION

Accordingly, it is the general purpose of the present invention to provide a level detector for use in a feature recognition system which fulfills the need for a highly accurate, fully automatic submarine detection system. The recognition system operates upon incoming MAD signals containing both submarine signals and signallike noise, by abstracting the primary feature or positive and negative slopes thereof, and by utilizing and processing these primary features to recognize and detect relatively invariant submarine signals therefrom.

The recognition system is divided into two major functional areas, the preprocessor system and the processor or signal recognition and detection system. The level detector is utilized in the processor. The preprocessor receives MAD amplitude-time domain information (i.e., varying amplitude signals in the time domain) and passes them through a plurality of filter channels each having a different bandwidth and center frequency to provide time waveforms in the amplitude-time-frequency domain (i.e., signals varying in both amplitude and frequency but having the same time base as the received MAD signals). Thereafter, the preprocessor both prepares the amplitude-time-frequency domain primary signals for (slope) feature abstraction and actually performs the feature abstraction operation. The processor receives the primary feature-abstracted signals and detects and recognizes therefrom the relative presence of invariant submarine signals or features as a function of degree of probability of detection and slant range from airborne feature recognition system to submerged submarine.

The processor comprises a plurality of recognition logic networks, each network including a range of logic circuits and each logic circuit per range being representative of a particular probability of detection as determined from empirical data, test results, and analysis. After the information is processed, if it satisfies the particular range criteria for the particular probability of detection for that range it is displayed thereby indicating a detected target (i.e., a submarine) with a degree of certainty equal to the degree of probability for the range.

The logic components comprise both analog and digital circuitry. The level detector (LD) serves as an interface between this circuitry. It is utilized to sense when an analog signal reaches a preselected level and generates a digital "1" output signal responsive thereto so long as the sensed signal remains above a preset threshold. The LD generates an "0" output when the sensed signal falls below this threshold.

The LD includes an operational amplifier having inverting and noninverting inputs. The analog signal is fed to the noninverting input through a variable resistor divider network. Also connected to this input (through a decoupling network) is a fixed negative voltage. A zener diode is connected in the feedback loop of the amplifier to the inverting input terminal thereof. Other elements are connected to control voltage offset, phase shift, and positive and negative output swings. When the input signal is sufficiently high to forward bias the zener diode, the LD provides a digital "1" output. At all other times a digital "0" is produced.

BRIEF DESCRIPTION OF THE DRAWING

The FIGURE is a schematic diagram of a level detector used in a recognition logic.

DESCRIPTION OF THE PREFERRED EMBODIMENT

The level detector of the FIGURE is used to sense when a received analog signal reaches a predetermined level. The LD generates a digital "1" output as long as the received signal exceeds a set threshold level. The LD generates a "0" output when the signal falls below this set threshold level. The threshold is adjustable as will be discussed hereinafter. The LD functions as an interface component between the analog and digital circuitry in the recognition logic and accepts analog signals (i.e., primary features and/or filter channel energy or log energy) and translates them into a "1" or "0" signal level. The level detector comprises an operational amplifier 500 which may be a standard commercial item, as, for example, type NS 7560, manufactured by National Semiconductor Corporation. The analog input signal is fed to the noninverting input of the amplifier 500 through a resistor divider network comprising variable resistor 501 and resistor 502. A fixed negative voltage $-V_1$ is also fed to this divider network through a decoupling network comprising resistor 503 and capacitor 504 as well as attenuating resistor 505. A substantially unilateral impedance zener diode 506 is connected across the operational amplifier 500 in the feedback loop thereof to the inverting input terminal of the operational amplifier. Zener 506 is further connected at point 507 (the zener anode) to a resistor 508, the other side of which is grounded. Operating voltage is fed into the level detector from like magnitude positive and negative power supplies $\pm V_2$ at points A and B, respectively, through decoupling networks comprising resistors 509 and grounded capacitor 510.

Also connected to the operational amplifier 500 is the combination of elements comprising resistor 512 and resistor 513 which serve to balance the voltage offset of the operational amplifier. The phase of the amplifier 500 is compensated for by the capacitor 511 and the phase compensation network comprising the capacitor 514 in series with the resistor 515.

Both the positive and negative output swings of the operational amplifier 500 are limited. Diode 516, the cathode of which is connected to the cathode of zener 506 and the anode of which is connected to the LD output, serves to limit the negative output swing of the amplifier 500. Similarly, anode grounded zener 517 in combination with the resistor 518 (which is in parallel with the diode 516) server to limit the positive output swing of the operational amplifier 500.

In operation, when the input signal increases from zero to its maximum level, the input to operational amplifier 500 across the resistor 502 varies from a slightly negative voltage to a positive voltage as a function of the resistance of variable resistor 501 and the magnitude of the bias supply $V_1$. The gain is determined principally by zener 506 and resistor 508 in the feedback loop and is controlled by the signal on the noninverting input of the amplifier 500. That is, the output of the amplifier 500, determined by the forward characteristics of zener 506 and the value of resistor 508, is usually negative but less so than the output voltage across resistor 502 (from $V_1$) with zero signal present. As the input signal increases in amplitude, however, the net input to the amplifier 500 goes less negative but the output still remains at approximately the same negative output voltage. When the input signal reaches a particular positive voltage or threshold, however, the input to the amplifier 500 approaches zero volts thereby causing it to go to a high gain state (i.e., the zener 506 becomes a high impedance when not forward biased). Thereafter, even a few millivolts' increase in input signal causes the output to increase rapidly until the breakdown voltage of zener 506 is reached. At this point the zener 506 acts as a low impedance causing the gain of the amplifier to approach unity (excluding loading by the input network). If the input is further increased the output will increase the same amount the net input across resistor 502 increases. Thus when the analog input signal exceeds a preset threshold, the LD provides a positive output. This output is shaped by zener 517 to provide a digital "1." Similarly, with negative input signals or positive signals below the preset threshold, the LD provides a negative output shaped by diode 516 to provide a digital "0." As noted, the threshold level of the LD can be varied by varying resistor 501. In determining the value of the resistor 501 required to detect a given input signal level, the given signal level is assumed to be present at the input and the value of resistor 501 is calculated to yield zero volts across resistor 502.

Obviously many modifications and variations of the present invention are possible in the light of the above teachings. It is therefore to be understood that within the scope of the appended claims the invention may be practiced otherwise than as specifically described.

What is claimed is:

1. A level detector for converting analog signals to digital signals comprising:
    an operational amplifier having a noninverting and an inverting input;
    a zener diode, the anode of which is connected to said inverting input of said operational amplifier and the cathode of which is connected to the output of said operational amplifier;
    first means connected to the output of said operational amplifier for limiting the positive output swing thereof;
    second means connected at one thereof to said first means and at the other end to said zener diode for limiting the negative output swing of said operational amplifier;
    an adjustable resistor divider network to provide preselectable threshold levels connected at one end thereof to said noninverting input and adapted to receive the analog signals at the other end thereof; and
    a first decoupling network operatively connected at one end thereof to said resistor divider network and adapted to receive a negative voltage at the other end thereof, whereby said operational amplifier provides a high digital output when the voltage difference between the analog signal supplied to said resistor divider network and the voltage supplied to said first decoupling network is greater than zero volts.

2. A level detector for converting analog signals to digital signals according to claim 1 further comprising:
    a second decoupling network connected to an input of said operational amplifier; and
    a third decoupling network connected to another input of said operational amplifier, said second decoupling network adapted to receive a negative voltage operating potential and said third decoupling network adapted to receive a like positive operating voltage potential.

3. A level detector for converting analog signals to digital signals according to claim 2 further comprising:
    voltage-balancing means operatively connected to said operational amplifier for balancing the voltage offset thereof; and
    a phase compensation network connected to said voltage-balancing means and said operational amplifier.

4. A level detector for converting analog signals to digital signals according to claim 3 further comprising:
    a resistive network grounded at one end thereof and operatively connected at the other end thereof to the anode of said zener diode, whereby the gain of said operational amplifier is substantially affected by the series impedance of said resistive network and said zener diode.

5. A level detector for converting analog signals to digital signals according to claim 4 wherein:
    said voltage-balancing means comprises resistor circuitry; and
    said phase compensation network comprises resistor-capacitor circuitry.

* * * * *

UNITED STATES PATENT OFFICE
CERTIFICATE OF CORRECTION

Patent No. 3,621,308                    Dated  November 16, 1971

Inventor(s) George J. Dusheck, Jr.

It is certified that error appears in the above-identified patent and that said Letters Patent are hereby corrected as shown below:

On the cover sheet of the patent, line 9, "18 Drawing Figs." should read -- 1 Drawing Fig. --.

Signed and sealed this 13th day of June 1972.

(SEAL)
Attest:

EDWARD M. FLETCHER, JR.                ROBERT GOTTSCHALK
Attesting Officer                      Commissioner of Patents